United States Patent [19]

Köhler et al.

[11] Patent Number: 5,338,355
[45] Date of Patent: Aug. 16, 1994

[54] METHOD OF PREPARING GOETHITE

[75] Inventors: Berndt-Ullrich Köhler, Krefeld, Fed. Rep. of Germany; Haruki Kurokawa, Hiroshima, Japan

[73] Assignee: Bayer AG, Leverkusen, Fed. Rep. of Germany

[21] Appl. No.: 165,921

[22] Filed: Dec. 14, 1993

[30] Foreign Application Priority Data

Dec. 23, 1992 [DE] Fed. Rep. of Germany ....... 4243760

[51] Int. Cl.$^5$ ............................................... C09C 1/22
[52] U.S. Cl. .................................. 106/457; 252/62.59; 423/633
[58] Field of Search ........................... 106/457, 456; 252/62.59; 423/632, 633

[56] References Cited

U.S. PATENT DOCUMENTS

| | | |
|---|---|---|
| 3,931,025 | 1/1976 | Woditsch et al. ................ 252/62.62 |
| 4,136,158 | 1/1979 | Okuda et al. ..................... 423/632 |
| 4,222,790 | 9/1980 | Dickerson ........................ 106/457 |
| 4,631,090 | 12/1986 | Naumann et al. ................ 106/457 |
| 5,244,649 | 9/1993 | Ostertag et al. ................. 423/633 |

Primary Examiner—Helene Klemanski
Assistant Examiner—Chris Gallo
Attorney, Agent, or Firm—Connolly & Hutz

[57] ABSTRACT

The present invention relates to a method of preparing Si-containing goethite ($\alpha$-FeOOH) by the precipitation of Fe(II) salts with an excess of base, and subsequent oxidation in the presence of a silicate solution.

16 Claims, No Drawings

METHOD OF PREPARING GOETHITE

The present invention relates to a method of preparing Si-containing goethite ($\alpha$-FeOOH) by the precipitation of Fe(II) salts with an excess of base, and subsequent oxidation in the presence of a silicate solution.

The alkaline process for preparing goethite is known from DE-A-2 162 716. This process is particularly suitable for the preparation of products in the form of long needles, which have a low impurity content and a low content of salts, and which are the preferred starting materials employed for the manufacture of magnetic iron oxide pigments.

In this process Fe(OH)$_2$ is first precipitated from solutions of iron(II) salts, e.g. FeSO$_4$ or FeCl$_2$ by the addition of more than the stoichiometric amount of a base, such as NH$_3$, Na$_2$CO$_3$, KOH or NaOH. Goethite is then prepared by oxidation using suitable oxidizing agents, particularly air. The preparation may proceed as a single stage. However a multistage process is also possible, further synthesis of the pigment being effected after the formation of nuclei by further additions of Fe$^{2+}$ or Fe$^{3+}$ and NaOH and oxidation.

The advantages of subsequent treatment with Si-containing compounds are known. Thus, according to JP-A-60-063 904 etc., the coercivity of magnetic pigments is increased when goethite is subsequently treated with silicic acid and heated to 500° to 800° C. According to JP-A-60-181 209, the magnetic properties and dispersibility of $\gamma$-Fe$_2$O$_3$ pigments are improved when they are subjected to a secondary treatment with sodium or potassium silicate before conversion to goethite. The coating of Co-coated $\gamma$-Fe$_2$O$_3$ with silicates also increases the coercive field strength of the product in particular, according to JP-A-55-072 007 and JP-A-55-083 208. According to EP-A-394 034, the magnetic and chemical stability of Fe(II)-containing products is strongly increased by coating them with silicates, amongst other materials. The addition of silicate during the so-called acid process for goethite preparation is described in JP-A-54-155 998 and JP-A-62-128 929, but is of minor importance on account of the very low solubility of silicates under these pH conditions.

The use of silicates in the alkaline process for goethite preparation is of greater importance, however. Thus a method of preparing acicular magnetic iron oxides is known from DE-A-2 202 853, silicate being added at the end of the oxidation phase, in order to provide silicon enrichment at the surface of the pigment to prevent sintering, and at the same time to produce pigments with excellent coercive field strengths.

An alkaline process for the preparation of goethite is described in U.S. Pat. No. 4,136,158, silicate and zinc being added before the commencement of the oxidation phase to form goethite, in order to reduce the time of reaction. It was found that the silicate had no effect on the viscosity of the Fe(OH)$_2$ suspension. In addition, a description was given of the effect of silicate on improving the particle size distribution and reducing the length of the particles. Moreover, it was found that zinc had the effect of increasing the length/width ratio, similarly to the acid preparation according to U.S. Pat. No. 3,931,025.

According to JP-A-60-103 040, hydrated silica may be used as a crystallisation nucleus, very fine-grained sol particles being added to the suspension before oxidation. According to JP-A-60-141 625, JP-A-56-026 730 and JP-A-60-092 401, the addition of silicate to the Fe(OH) 2 suspension before oxidation, or to the alkaline component which may consist of NaOH, KOH, (NH$_4$)$_2$CO$_3$ or a mixture thereof, results in short acicular products with a low content of dendrites, good dispersibility and a high coercive field strength. According to JP-A-54-079 200, these properties were also observed for products to which Co-containing dopant materials were added. According to JP-A-62-223 022, a nucleus may also first be produced in the presence of silicon, and subsequently grown by further additions of Fe$^{2+}$ salts and/or alkalies. Products corresponding to this method of preparation are characterized by their high length/width ratio and low production costs.

In the course of a search for an economic method of preparing goethite by the alkaline process, the object was to increase the space-time yield of a product which is prepared using a slight excess of NaOH and which retains its desirable properties, and which is optimised simply with respect to its properties, without cost being taken into consideration.

Surprisingly, it has now been found that the addition of silicate in the form of a silicate-containing solution, either continuously or in multiple batches, over a certain period during the oxidation phase in the preparation of goethite by the alkaline process, drastically reduces the viscosity level during oxidation, with the result that the rate of oxidation and the space-time yield are considerably increased. Moreover a product can be obtained—by effecting an initial oxidation without silicate—which exhibits the desirable properties of goethites prepared by the alkaline process which are completely free from silicates.

The present invention accordingly relates to a method of preparing Si-containing goethite ($\alpha$-FeOOH) by the precipitation of Fe(II) salts with an excess of base and subsequent oxidation in the presence of a silicate solution, at least part of the silicate solution being added during the oxidation. In this method it is particularly advantageous to precipitate Fe(OH)$_2$ in a first step, by mixing an iron(II)-containing salt (e.g. FeSO$_4$.7H$_2$O or FeCl$_3$.6H$_2$O) with a stoichiometric excess of a base such as Na$_2$CO$_3$ or KOH, or preferably NaOH. Silicate in the form of a silicate-containing solution, comprising potassium silicate for example, but preferably comprising sodium silicate, is added during subsequent oxidation with a suitable oxidizing agent, particularly air.

In this procedure the amount of silicate solution is preferably 0.05 to 2 weight %, most preferably 0.1 to 1 weight %, calculated as Si and based on the iron content.

According to the present invention, the silicate solution is preferably added either continuously or in several portions in the oxidation range from 5 to 90%, most preferably from 10 to 80%. Particularly good results are obtained when the addition commences at the latest when the degree of oxidation has reached 50%, preferably 30%.

It may also be advantageous if the goethite is prepared in the presence of one or more of the elements Zn, Mg, Ca, St, Ba, Mn and Al in amounts from 0.1 to 2 weight % based on the iron content, the addition preferably being effected before the completion of the Si addition, and most preferably before the commencement of the Si addition.

The goethites prepared by the method according to the invention may be converted, with or without subsequent treatment with suitable organic and/or inorganic substances, to magnetic pigments of high coercivity and good switching field distribution. These may be used as such as magnetic pigments, or used after further modification, e.g. with cobalt.

In the following examples, viscosities were measured with a Haake RV 20 viscometer fitted with an MSS measuring device. This enabled the temperature- and shear-rate dependency of the viscosity to be measured automatically at increasing and/or decreasing rates of shear.

Specific surfaces were measured by the nitrogen 1 point BET method (DIN 66 131). Crystallite sizes were determined by the Soberer X-ray diffraction method, based on the reflection on the (110) plane.

The invention is described below by means of examples, without the invention being seen as restricted thereto.

COMPARATIVE EXAMPLES 1 to 9

A solution of NaOH (10 l), which contained a 50% excess of NaOH over the stoichiometric amount required for complete precipitation of the particular amount of iron to be added, was introduced into a stirred reactor of capacity 30 l. After adjusting the temperature to 30° C. the scheduled amount of iron was added, under nitrogen and with stirring, as a correspondingly adjusted solution of iron sulphate (10 l). After stirring for five minutes the temperature control was removed and the reaction mixture was sparged with air via a sparge ring located at the base of the reactor. The viscosity was determined at 30 minute intervals, by measuring the viscosity of a sample immediately after the particular sample was taken. The results of the viscosity measurements are given in Table 1.

TABLE 1

Properties of the products from Comparative Examples 1 to 9:

| Comparative Example | $FeSO_4$ [g/l] | Air [l/l/h] | Oxn. time [min] | Specific surface [$m^2/g$] | Crystallite size [nm] | Maximum viscosity [mPa·s] |
|---|---|---|---|---|---|---|
| 1 | 60 | 3 | 260 | 40 | 15.5 | 136 |
| 2 | 60 | 3 | 245 | 39 | 15.5 | 145 |
| 3 | 70 | 3.8 | 260 | 40 | 16.0 | 156 |
| 4 | 80 | 4.4 | 320 | 35 | 19.0 | 201 |
| 5 | 90 | 5 | 335 | 34 | 19.0 | 206 |
| 6 | 90 | 5.5 | 265 | 32 | 19.0 | 214 |
| 7 | 100 | 5 | 360 | 29 | 22.0 | 248 |
| 8 | 100 | 5.5 | 285 | 28 | 21.5 | 286 |
| 9 | 110 | 6 | 310 | 25 | 24.0 | 271 |

EXAMPLES 10 to 12 (According to the Invention) with a Single Si Addition

The procedure employed was similar to that used in comparative examples 1 to 9. However, Si in the form of a sodium silicate solution was added 60 minutes after the commencement of oxidation, the remainder of the procedure being as described for the comparative examples. Further information regarding the procedure employed and the results of the viscosity measurements is given in Table 2.

TABLE 2

Properties of the products from Examples 10 to 12:

| Example | $FeSO_4$ [g/l] | Air [l/l/h] | Oxn. time [min] | $SiO_2$ [%] | S.s.a. [$m^2/g$] | Crystallite size [nm] | Max. viscosity [mPa·s] |
|---|---|---|---|---|---|---|---|
| 10 | 90 | 5.5 | 240 | 0.3 | 43 | 16.5 | 217 |
| 11 | 90 | 5.5 | 210 | 1 | 65 | 14.0 | 193 |
| 12 | 90 | 5.5 | 210 | 1 | — | — | 192 |

EXAMPLES 13 to 20 (According to the Invention) with Multiple Si Additions

The procedure employed here was also as described for comparative examples 1 to 9, except that multiple Si additions were commenced after a time of oxidation of 60 minutes. The remainder of the experimental procedure was similar to that employed in comparative examples 1 to 9. Further information on the number of additions, the time interval between additions and on the results of the viscosity measurements is given in Table 3.

TABLE 3

Properties of the products from Examples 13 to 20:

| Example | $FeSO_4$ [g/l] | Air [l/l/h] | Oxn. time [min] | $SiO_2$ [%] | No. of additions | Time interval [min] | S.s.a. [$m^2/g$] | Crystallite size [nm] | Max. viscosity [mPa·s] |
|---|---|---|---|---|---|---|---|---|---|
| 13 | 90 | 5.5 | 215 | 1.0 | 6 | 30 | 52 | 18.0 | 137 |
| 14 | 90 | 5.5 | 225 | 1.0 | 5 | 30 | 51 | 18.5 | 147 |
| 15 | 90 | 5.5 | 240 | 1.0 | 3 | 40 | 53 | 18.0 | 152 |
| 16 | 90 | 5.5 | 240 | 0.75 | 3 | 50 | 53 | 18.0 | 167 |
| 17 | 100 | 5.5 | 225 | 1.0 | 3 | 50 | 48 | 20.0 | 159 |
| 18 | 100 | 5.5 | 240 | 0.85 | 3 | 50 | 49 | 18.0 | 188 |
| 19 | 110 | 6.0 | 245 | 1.0 | 3 | 50 | 49 | 19.5 | 166 |
| 20 | 90 | 5.5 | 200 | 1.0 | 3 | 50 | 68 | 13.5 | 166 |

EXAMPLES 21 to 32 (According to the Invention) with Continuous Si Addition

These examples were carried out as described for comparative examples 1 to 9, except that continuous Si addition was commenced after a time of oxidation of 60 minutes. The remainder of the experimental procedure was similar to that described for comparative examples 1 to 9. Further information on the Si addition, the addition period and on the results of the viscosity measurements is given in Table 4.

TABLE 4

Properties of the products from examples 21 to 32:

| Example | FeSO$_4$ [g/l] | Air [l/l/h] | Oxn. time [min] | SiO$_2$ [%] | Time [min] | S.s.a. [m$^2$/g] | Crystallite size [nm] | Max. viscosity [mPa · s] |
|---|---|---|---|---|---|---|---|---|
| 21 | 90 | 5.5 | 225 | 1.0 | 160 | 50 | 17.0 | 144 |
| 22 | 90 | 5.5 | 240 | 0.3 | 180 | 43 | 16.5 | 175 |
| 23 | 90 | 5.5 | 225 | 2.5 | 120 | 72 | 11.5 | 159 |
| 24 | 90 | 5.5 | 210 | 2.5 | 120 | 61 | 15.0 | 162 |
| 25 | 90 | 5.5 | 255 | 1.0 | 90 | 50 | 19.5 | 134 |
| 26 | 90 | 5.5 | 225 | 1.0 | 120 | 52 | 18.0 | 147 |
| 27 | 90 | 5.5 | 220 | 0.75 | 120 | 53 | 17.0 | 165 |
| 28 | 100 | 5.5 | 255 | 1.0 | 120 | 46 | 20.0 | 148 |
| 29 | 100 | 5.5 | 255 | 0.85 | 120 | 46 | 18.5 | 180 |
| 30 | 110 | 6.0 | 245 | 1.0 | 120 | 48 | 18.5 | 160 |
| 31 | 100 | 5.5 | 255 | 0.85 | 120 | 45 | 17.5 | 170 |
| 32* | 90 | 5.5 | 225 | 1.0 | 120 | 70 | 13.5 | 169 |

*1% Zn was added to the FeSO$_4$ solution before precipitation

What is claimed is:

1. A method of preparing Si-containing goethite ($\alpha$-FeOOH) by the precipitation of Fe(II) salts with an excess of base and subsequent oxidation in the presence of a silicate solution, wherein at least part of the silicate solution is added during the oxidation.

2. A method according to claim 1, wherein the amount of silicate solution is 0.05 to 2 weight % based on the iron content and calculated as Si.

3. A method according to claim 1, wherein the silicate solution is either added continuously or in several portions whilst the degree of oxidation ranges from 5 to 90%.

4. A method according to claim 3, wherein the silicate solution is added whilst the degree of oxidation ranges from 10 to 80%.

5. A method according to claim 1, wherein the addition of the silicate solution commences at the latest when there is a 50% degree of oxidation.

6. A method according to claim 1, wherein the preparation of goethite is effected in the presence of one or more of the elements Zn, Mg, Ca, Sr, Mn and Al in amounts from 0.1 to 2 weight %, based on the Fe content.

7. A method according to claim 1, wherein the amount of silicate solution is 0.1 to 1 weight % based on the iron content and calculated as Si.

8. A method according to claim 2, wherein the silicate solution is either added continuously or in several portions during the period when the degree of oxidation ranges from 5 to 90%.

9. A method according to claim 2, wherein the addition of the silicate solution commences at the latest when there is a 50% degree of oxidation.

10. A method according to claim 3, wherein the addition of the silicate solution commences at the latest when there is a 50% degree of oxidation.

11. A method according to claim 4, wherein the addition of the silicate solution commences at the latest when there is a 50% degree of oxidation.

12. A method according to claim 1, wherein the addition of the silicate solution commences at the latest when there is a 30% degree of oxidation.

13. A method according to claim 2, wherein the preparation of goethite is effected in the presence of one or more of the elements Zn, Mg, Ca, Sr, Ba, Mn and Al in amounts from 0.1 to 2 weight % based on the Fe content.

14. A method according to claim 3, wherein the preparation of goethite is effected in the presence of one or more of the elements Zn, Mg, Ca, Sr, Ba, Mn and Al in amounts from 0.1 to 2 weight % based on the Fe content.

15. A method according to claim 4, wherein the preparation of goethite is effected in the presence of one or more of the elements Zn, Mg, Ca, Sr, Ba, Mn and Al in amounts from 0.1 to 2 weight % based on the Fe content.

16. A method according to claim 5, wherein the preparation of goethite is effected in the presence of one or more of the elements Zn, Mg, Ca, Sr, Ba, Mn and Al in amounts from 0.1 to 2 weight % based on the Fe content.

* * * * *

UNITED STATES PATENT AND TRADEMARK OFFICE
CERTIFICATE OF CORRECTION

Page 1 of 2

PATENT NO. : 5,338,355
DATED : August 16, 1994
INVENTOR(S) : Kohler, et. al.

It is certified that error appears in the above-indentified patent and that said Letters Patent is hereby corrected as shown below:

On the cover page of the patent, section [56] should include the following:

FOREIGN PATENT DOCUMENTS 0394034　　　10/1990　　　European Patent Office

OTHER PUBLICATIONS

Orbit Abstract of J60141625, July 1985.
Orbit Abstract of J62128929, June 1987.
Orbit Abstract of J62223022, Oct. 1987.
Derwent Abstract of J6 0181-209, Sept. 1985.
Derwent Abstract of J6 0103-040, June 1985.
Derwent Abstract of J6 0063-904, April 1985.
Derwent Abstract of J6 0092-401, May 1985.
Derwent Abstract of J5 6026-730, March 1981.
Derwent Abstract of J5 4155-998, Dec. 1979.
Derwent Abstract of J5 4079-200, June 1979.
Derwent Abstract of J5 5083-208, June 1980.

UNITED STATES PATENT AND TRADEMARK OFFICE
CERTIFICATE OF CORRECTION

PATENT NO. : 5,338,355
DATED : August 16, 1994
INVENTOR(S) : Kohler, et. al.

It is certified that error appears in the above-indentified patent and that said Letters Patent is hereby corrected as shown below:

Derwent Abstract of J5 5072-007, May 1980.

Signed and Sealed this

Twelfth Day of September, 1995

Attest:

BRUCE LEHMAN

Attesting Officer     Commissioner of Patents and Trademarks